United States Patent [19]

Fu et al.

[11] 4,413,096
[45] Nov. 1, 1983

[54] α-OLEFIN COPOLYMERS CONTAINING PENDANT HINDERED AMINE GROUPS

[75] Inventors: Frank T. Fu, Taipei, Taiwan; Roland A. E. Winter, Armonk, N.Y.

[73] Assignee: Ciba-Geigy Corporation, Ardsley, N.Y.

[21] Appl. No.: 342,876

[22] Filed: Jan. 26, 1982

Related U.S. Application Data

[63] Continuation-in-part of Ser. No. 253,484, Apr. 13, 1981, abandoned.

[51] Int. Cl.³ .................. C08L 75/04; C08L 39/04; C08L 77/00
[52] U.S. Cl. .................. 525/204; 525/203; 526/262; 526/263; 526/265
[58] Field of Search .......... 524/86, 87, 91, 99, 524/102; 525/203, 204; 526/258, 265, 262, 263; 546/20, 188

[56] References Cited

U.S. PATENT DOCUMENTS

| | | | |
|---|---|---|---|
| 3,705,166 | 12/1972 | Murayama et al. | 260/293.86 |
| 4,210,612 | 7/1980 | Karrer | 525/204 |
| 4,276,401 | 6/1981 | Karrer | 526/265 |
| 4,294,949 | 10/1981 | Karrer | 526/262 |

*Primary Examiner*—John Kight, III
*Assistant Examiner*—Kriellion Morgan
*Attorney, Agent, or Firm*—Luther A. R. Hall

[57] ABSTRACT

α-Olefin copolymers having recurring structural units of the formula

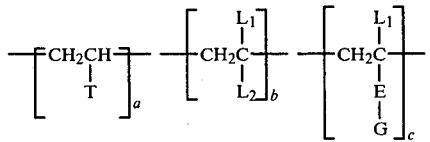

where preferably T is hydrogen, $L_1$ is hydrogen, $L_2$ is $COOL_3$, $L_3$ is lower alkyl, E is —COO—, G is a hindered amine moiety, $a/a+b+c=0.50$ to $0.99$, $b/a+b+c=0$ to $0.49$ and $c/a+b+c=0.01$ to $0.50$, are useful as light stabilizers for polymeric substrates, particularly polyolefins.

20 Claims, No Drawings

α-OLEFIN COPOLYMERS CONTAINING PENDANT HINDERED AMINE GROUPS

This is a continuation-in-part of application Ser. No. 253,484, filed on Apr. 13, 1981, now abandoned.

BACKGROUND OF THE INVENTION

The present invention relates to α-olefin copolymers containing pendant hindered amine groups which are useful as light and heat stabilizers for organic materials and to stabilized compositions containing said copolymers.

The hindered amine compounds having the 2,2,6,6-tetra-substituted piperidinyl structure have long been known as effective light stabilizers for organic materials and have enjoyed considerable commercial success.

Such hindered amine light stabilizers are described in detail by H. J. Heller and H. R. Blattmann, Pure and Applied Chemistry, 36, 141–161 (1973).

It is known from U.S. Pat. No. 3,705,166 that monomeric acrylic acid derivatives which contain at least one piperidinyl group having a sterically hindered nitrogen atom may be used as light stabilizers in organic polymers. However, these acrylic acid derivatives tend to be too volatile.

In U.S. Pat. Nos. 4,210,612 and 4,294,949 homopolymeric and certain copolymeric compounds having pendant hindered amine moieties are described as useful light stabilizers. The homopolymers are those made by the free radical polymerization of acryloyl or methacryloyl derivatives of compounds containing hindered amine moieties. The copolymers are those made by the free radical copolymerization of the acryloyl or methacryloyl substituted hindered amine monomers with other ethylenically unsaturated monomers such as styrene, an alkyl acrylate, an alkyl methacrylate, acrylonitrile, a maleimide or N-vinylpyrrolidone. Although α-olefins are generically disclosed as possible comonomers among a very wide variety of ethylenically unsaturated monomers, ethylene copolymers containing pendant hindered amine moieties are not described nor are their particularly advantageous properties contemplated.

Copolymers of acryloyl or methacryloyl substituted hindered amine monomers with acryloyl or methacryloyl monomers containing light absorbing moieties such as the benzophenones, benzotriazoles, α-cyanocinnamates or benzalmalonates are described in U.S. Pat. No. 4,276,401 as being useful light stabilizers for organic materials.

DETAILED DISCLOSURE

This invention pertains to α-olefin copolymers containing pendant hindered amine groups which are useful as light and heat stabilizers for organic materials and to stabilized compositions containing said copolymers.

More particularly, the α-olefin copolymers of this invention have recurring structural units, joined in essentially a random fashion, of the formula I

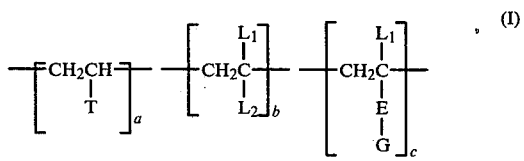

wherein

T is hydrogen, alkyl of 1 to 18 carbon atoms or mixtures thereof, $L_1$ is hydrogen or methyl, $L_2$ is hydroxyl, —OCOCH$_3$ or —COOL$_3$, $L_3$ is hydrogen or alkyl of 1 to 6 carbon atoms, E is —COO—, —OCO—, —O— or —CONR—, R is hydrogen, alkyl of 1 to 12 carbon atoms, aralkyl of 7 to 12 carbon atoms, cyclohexyl, hydroxyalkyl of 1 to 6 carbon atoms, alkoxyalkyl of 2 to 10 carbon atoms or dialkylaminoalkyl of 3 to 12 carbon atoms, G is a group containing an N-heterocyclic ring of the formula

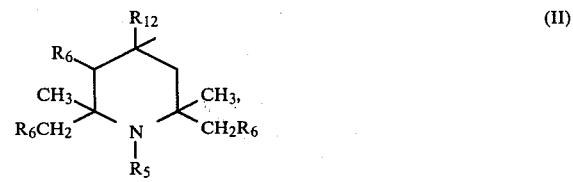

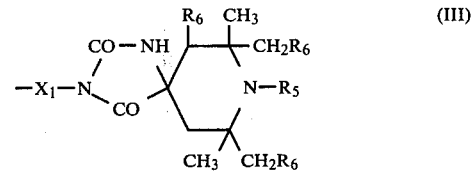

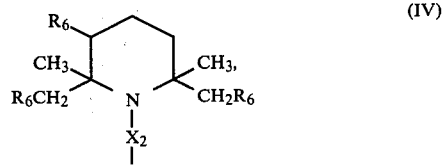

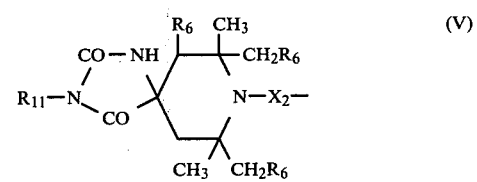

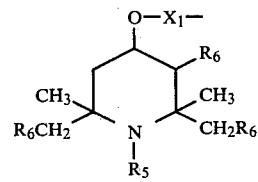

-continued

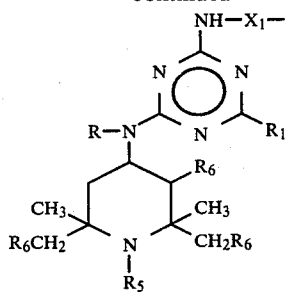

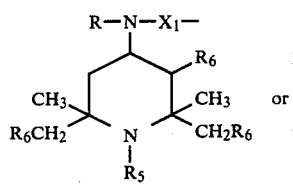

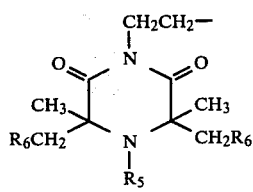

in which $R_5$ is hydrogen, oxyl, $C_1$-$C_{18}$ alkyl, $C_3$-$C_8$ alkenyl, $C_3$-$C_6$ alkynyl, $C_7$-$C_{12}$ aralkyl, —$CH_2CN$, $C_2$-$C_{21}$ alkoxyalkyl, an aliphatic acyl group having 1–4 C atoms or one of the groups —$CH_2COOR_7$ or —$COOR_8$, in which $R_7$ is $C_1$-$C_{12}$ alkyl, $C_3$-$C_8$ alkenyl, phenyl, $C_7$-$C_8$ aralkyl or cyclohexyl and $R_8$ is $C_1$-$C_{12}$ alkyl, phenyl, benzyl or cyclohexyl, and $R_6$ is hydrogen or $C_1$-$C_4$ alkyl, and $X_1$ is $C_3$-$C_{12}$ alkylene, —$CH_2$-$CH_2O$—$CH_2CH_2$— or a group of the formula —$CH(R_{10})$—$CH_2$—(VI), in which $R_{10}$ is hydrogen, methyl, ethyl, phenoxymethyl or phenyl, and $X_2$ is a group of the formula VI, in which $R_{10}$ is as defined above, or a group of the formula —$CH_2$—$CH(OH)$—$CH_2$—(VII), $R_{11}$ is $C_1$-$C_{18}$ alkyl or is cyclohexyl, phenyl or benzyl which are unsubstituted or substituted by $C_1$-$C_4$ alkyl or $C_1$-$C_4$ alkoxy, $R_1$ is alkoxy of 1 to 12 carbon atoms, phenoxy,

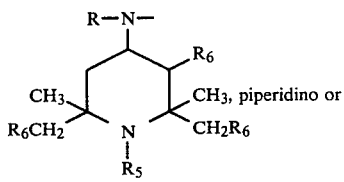

$NR_2R_3$ where $R_2$ and $R_3$ are hydrogen, alkyl of 1 to 12 carbon atoms, cyclohexyl or benzyl, $R_{12}$ is hydrogen or hydroxy, with the proviso that, when $R_{12}$ is hydroxy, E is —OCO—, a+b+c=4 to 2600
a=2 to 2400
b=0 to 198
c=2 to 200
a/a+b+c=0.50 to 0.99
b/a+b+c=0 to 0.49, and
c/a+b+c=0.01 to 0.50

The α-olefin copolymers of this invention have molecular weight in the range of 500 to 500,000 as measured by gel permeation chromatography or by viscometry of polymer solutions or polymer melts.

The instant α-olefin copolymers are made up of at least two different recurring structural units while additional different structural units may also be present.

The starting polymeric intermediate is an α-olefin copolymer, preferably an ethylene copolymer, which may additionally have a second α-olefin component. Preferably only one α-olefin component is present.

In formula I, the first structural unit represents the α-olefin component where T is hydrogen or alkyl of 1 to 18 carbon atoms or mixtures thereof when mixtures of α-olefins are used. Preferably T is hydrogen where the α-olefin is ethylene. There is always some of this unit in the copolymer as seen by molar ratio values for a/a+b+c being a positive number from 0.50 to 0.99. On a molar basis at least half of each copolymer of this invention is α-olefin.

The second structural unit of formula I represents the polar comonomer with which the α-olefin, preferably ethylene, was first polymerized before the pendant hindered amine group is attached to the olefin copolymer chain. Such copolymers are olefin, preferably ethylene, copolymers with acrylic acid, lower alkyl acrylates, methacrylic acid, lower alkyl methacrylates and vinyl acetate. When the vinyl acetate copolymer is hydrolyzed, the corresponding vinyl alcohol copolymer is obtained. Thus $L_1$ is hydrogen or methyl, and since acrylic acid and lower alkyl acrylates are preferred, $L_1$ is preferably hydrogen.

By like token $L_2$ can be hydroxy, —$OCOCH_3$ or —$COOL_3$ where $L_3$ is hydrogen or alkyl of 1 to 6 carbon atoms. Preferably $L_2$ is —$COOL_3$ where $L_3$ is alkyl of 1 to 6 carbon atoms.

These pendant polar functional groups represented by $L_2$ provide the sites on which, after appropriate esterification, transesterification, amidation or other chemical reaction, a pendant hindered amine moiety may be attached. Preferably essentially all of the existing polar groups in the α-olefin copolymer are reacted so that very little if any of the original polar groups remain in the final copolymer product containing pendant hindered amine moieties. This is seen by the molar ratio of b/a+b+c which may be and is preferably zero.

However, by the judicious choice of amounts of reactants, it is possible to react any desired proportion of the polar groups $L_2$ to tailor the position and number of pendant hindered amine warheads along the polymer chain in the final copolymer product. This allows the preparation of copolymers of specific chemical and physical properties for individual end use applications. In such cases the molar ratio of b/a+b+c is a positive value above zero ranging up to 0.49.

The third structural unit in formula I represents the units to which a hindered amine moiety has been attached. The group E is —COO—, —OCO—, —O— or —CONR— which relates directly to the values of $L_2$. Preferably E is —COO— or —CONR—.

When an alcohol, an amine or an acid containing a hindered amine moiety is reached with an olefin copolymer containing pendant $L_2$ groups by standard esterification, transesterification or amidation procedures, all or a portion of said $L_2$ groups are replaced with groups having the pendant E-G moieties. The exact nature of G is not critical except that it contains a hindered amine group. Such groups contain an N-heterocyclic ring of the formula

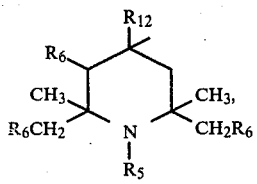
(II)

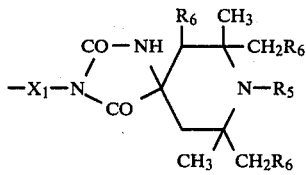
(III)

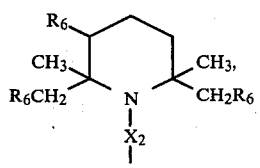
(IV)

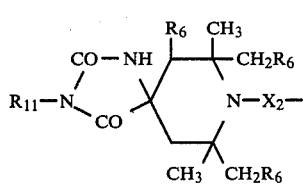
(V)

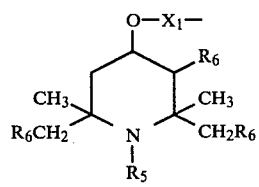

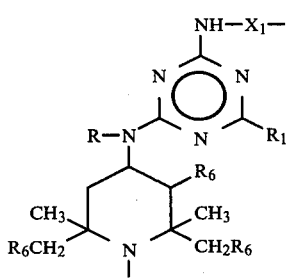

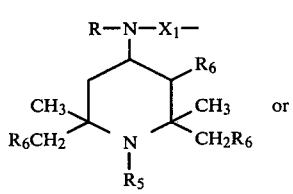

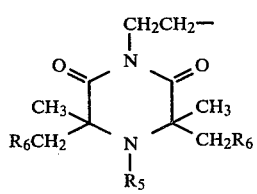

in which R is hydrogen, alkyl of 1 to 12 carbon atoms, aralkyl of 7 to 12 carbon atoms, cyclohexyl, hydroxyalkyl of 1 to 6 carbon atoms, alkoxyalkyl of 2 to 10 carbon atoms or dialkylaminoalkyl of 3 to 12 carbon atoms, preferably hydrogen, $R_1$ is alkoxy of 1 to 12 carbon atoms, phenoxy

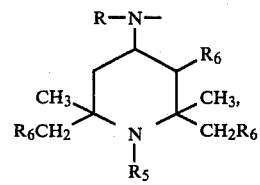

piperidino or $NR_2R_3$ where $R_2$ and $R_3$ are hydrogen, alkyl of 1 to 12 carbon atoms, cyclohexyl or benzyl, $R_5$ is hydrogen, oxyl, $C_1$–$C_{18}$, $C_3$–$C_8$ alkenyl, $C_3$–$C_6$ alkynyl, $C_7$–$C_{12}$ aralkyl, —$CH_2CN$, $C_2$–$C_{21}$ alkoxyalkyl, an aliphatic acyl group having 1–4 C atoms or one of the groups —$CH_2COOR_7$ or $COOR_8$ in which $R_7$ is $C_1$–$C_{12}$ alkyl, $C_3$–$C_8$ alkenyl, phenyl, $C_7$–$C_8$ aralkyl or cyclohexyl and $R_8$ is $C_1$–$C_{12}$ alkyl, phenyl, benzyl or cyclohexyl, and $R_6$ is hydrogen or $C_1$–$C_4$ alkyl, and $X_1$ is $C_3$–$C_{12}$ alkylene, —$CH_2CH_2OCH_2CH_2$— or a group of the formula —$CH(R_{10})$—$CH_2$—(VI), in which $R_{10}$ is hydrogen, methyl, ethyl, phenoxymethyl or phenyl, and $X_2$ is a group of the formula VI, in which $R_{10}$ is as defined above, or a group of the formula —$CH_2$—$CH(OH)$—$CH_2$— (VII), $R_{11}$ is $C_1$–$C_{18}$ alkyl or is cyclohexyl, phenyl or benzyl which are unsubstituted or substituted by $C_1$–$C_4$ alkyl or $C_1$–$C_4$ alkoxy, and $R_{12}$ is hydrogen or hydroxy.

G can be preferably a group of the formulas II, III, IV or V. Most preferably G is a group of the formulae II or IV where $R_{12}$ is hydrogen.

As $C_1$–$C_{18}$ alkyl, $R_5$ is, for example, methyl, ethyl, n-propyl, n-butyl, n-pentyl, n-octyl, n-decyl, n-dodecyl or octadecyl. Preferred alkyl groups are those having 1–12 C atoms, also those having 1–8 C atoms and especially those having 1–4 C atoms and in particular methyl.

As $C_3$–$C_8$ alkenyl, $R_5$ is, for example, allyl, 3-methyl-2-butenyl, 2-butenyl, 2-hexenyl or 2-octenyl, especially allyl.

As $C_3$–$C_6$ alkynyl, $R_5$ is, for example propargyl.

As $C_7$–$C_{12}$ aralkyl, $R_5$ is, for example, benzyl, β-phenylethyl or 4-tert-butyl-benzyl.

If $R_5$ is $C_2$–$C_{21}$ alkoxyalkyl, the alkyl part can contain 1–3 C atoms and the alkoxy part can consist of 1–18 C atoms, as, for example, in methoxymethyl, ethoxymethyl, 2-methoxyethyl, 2-ethoxymethyl, 2-n-butoxyethyl, 3-n-butoxypropyl, 2-octoxyethyl or 2-octadecyloxyethyl, preferred compounds are those in which $R_5$ is an alkoxyalkyl group having 2–6 C atoms.

As an aliphatic acyl group having 1–4 C atoms, $R_5$ is, for example, formyl, acetyl, acryloyl or crotonoyl, especially acetyl.

As $C_1$–$C_4$ alkyl, $R_6$ is branched or, especially, non-branched alkyl, such as ethyl, n-propyl or n-butyl, but in particular methyl. $R_6$ is preferably hydrogen.

As $C_1$–$C_{12}$ alkyl, $R_9$ is, for example, methyl, ethyl, n-propyl, n-butyl, n-pentyl, n-octyl, n-decyl or n-dodecyl; preferably, however, $R_9$ is $C_1$–$C_4$ alkyl.

As $C_7$–$C_{12}$ aralkyl, $R_9$ is especially phenylethyl or in particular benzyl.

$R_{10}$ is phenyl or phenoxymethyl, preferably methyl or ethyl and especially hydrogen.

As $C_1$–$C_{18}$ alkyl, $R_{11}$ is, for example, methyl, ethyl, propyl, butyl, hexyl, octyl, dodecyl or octadecyl. Preferred alkyl groups are those having 1–12 C atoms.

$R_{11}$ can also be benzyl, cyclohexyl or phenyl and these can be substituted in the nucleus by $C_1$–$C_4$ alkyl, such as methyl, ethyl, propyl or a butyl, or by $C_1$–$C_4$ alkoxy, such as methoxy, ethoxy, propoxy or n-butoxy.

If $R_5$ is the group —$CH_2COOR_7$ or —$COOR_8$, $R_7$ and $R_8$ as $C_1$–$C_{12}$ alkyl, are, for example, methyl, ethyl, isopropyl, n-butyl, isobutyl, t-butyl, isopentyl, n-octyl or n-dodecyl. Preferably, $R_7$ and $R_8$ are $C_1$–$C_4$ alkyl. As $C_3$–$C_8$ alkenyl, $R_7$ is, for example, allyl, 2-butenyl or 2-hexenyl. As $C_7$–$C_8$ aralkyl, $R_7$ is, for example, benzyl or β-phenylethyl.

Preferably the copolymers of formula I are those where G is a group of the formulae II, III, IV or V, in which $R_5$ is hydrogen, $C_1$–$C_{12}$ alkyl, $C_3$–$C_5$ alkenyl, propargyl, $C_7$–$C_8$ aralkyl, acetyl, or $C_2$–$C_{10}$ alkoxyalkyl and $R_6$ is hydrogen or methyl and E is —COO— or —CONR— in which R is hydrogen, $C_1$–$C_{12}$ alkyl or benzyl, and $X_1$ is a group of the formula VI, in which $R_{10}$ is hydrogen or methyl, and $X_2$ is a group of the formulae VI or VII, in which $R_{10}$ is as defined above, and $R_{11}$ is $C_1$–$C_{12}$ alkyl or benzyl, and $R_{12}$ is hydrogen.

Most preferred copolymers of formula I are those where G is a group of the formulae II or IV, in which $R_5$ is hydrogen, $C_1$–$C_8$ alkyl, benzyl or acetyl and $R_6$ is hydrogen or methyl and E is —COO— or —CONR— in which R is hydrogen or $C_1$–$C_8$ alkyl, and $X_2$ is a group of the formulae VI or VII, in which $R_{10}$ is hydrogen, methyl or ethyl, and $R_{12}$ is hydrogen.

Further preferred copolymers of the formula I are where G is a group of the formulae II or IV, in which $R_5$ is hydrogen, $C_1$–$C_4$ alkyl, benzyl or acetyl and $R_6$ is hydrogen and E is —COO— or —CONR— in which R is hydrogen or $C_1$–$C_4$ alkyl, and $X_2$ is a group of the formulae VI or VII, in which $R_{10}$ is hydrogen or methyl, and $R_{12}$ is hydrogen.

Particularly preferred compounds are ethylene copolymers of the formula I in which G is a group of the formulae II or IV, in which $R_5$ is hydrogen, methyl or acetyl, $R_6$ is hydrogen and E is —COO— or —CONR— in which R is hydrogen or $C_1$–$C_4$ alkyl, and $X_2$ is a group of the formulae VI or VII, in which $R_{10}$ is hydrogen, and $R_{12}$ is hydrogen.

There is always some of this third structural unit in the copolymer of this invention as seen by the molar ratio values for $c/a+b+c$ being a positive number from 0.01 to 0.50.

Especially preferred are the copolymers where -E-G is

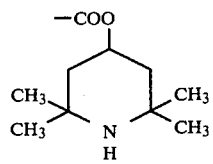

The molecular weight of the instant olefin copolymers range from about 500 to about 500,000. Values of $a+b+c=4$ to 2600.

While the instant α-olefin copolymers containing pendant hindered amine groups may range in molecular weight from essentially oligomeric structures with a molecular weight of about 500 to high polymer materials with a molecular weight up to 500,000, the preferred molecular weight range is 5,000 to 100,000 and most preferably is 10,000 to 50,000. These ranges essentially correspond to values of $a+b+c$ of 40 to 520 and 80 to 260 respectively.

The α-olefin copolymers such as ethylene/ethyl acrylate, ethylene/methyl acrylate, ethylene/methyl acrylate/acrylic acid, ethylene/vinyl acetate, ethylene/vinyl alcohol and the like are items of commerce with copolymers having various molecular weights (melt indices) and weight percents of ethyl acrylate or other comonomers being available.

The free radical polymerization of ethylene or other olefin monomers with various polar comonomers is known in the art and an appropriate diversity of starting olefin copolymer intermediates is thus available.

Examples of hindered amine alcohols and amines which can be used in the instant invention include 1-(2-hydroxyethyl)-2,2,6,6-tetramethylpiperidine, 1,2,2,6,6-pentamethyl-4-aminopiperidine, 1-acetyl-2,2,6,6-tetramethyl-4-aminopiperidine, 1-benzyl-2,2,6,6-tetramethyl-4-aminopiperidine, 1,3,8-triaza-2,4-dioxo-3-(2-hydroxyethyl)-7,7,8,9,9-pentamethylspiro[4.5]-decane, 1,3,8-triaza-2,4-dioxo-3-n-dedecyl-7,7,9,9-tetramethyl-8-(2-hydroxyethyl)-spiro[4.5]decane, 1,3,8-triaza-2,4-dioxo-3-(2-hydroxyethyl)-7,7,9,9-tetramethyl-8-benzyl-spiro[4.5]decane 1,3,8-triaza-2,4-dioxo-3-n-butyl-7,7,9,9-tetramethyl-8-(2-hydroxyethyl)spiro[4.5]decane, 1-benzyl-2,2,6,6-tetramethyl-4-(N-n-butyl)aminopiperidine, 1,2,2,6,6-pentamethyl-4-(N-benzyl)aminopiperidine, 1,2,2,6,6-pentamethyl-4-(N-n-propyl)aminopiperidine, 1-allyl-2,2,6,6-tetramethyl-4-hydroxypiperidine and 1-(2,3-dihydroxypropyl)-2,2,6,6-tetramethylpiperidine.

A typical acid containing a hindered amine group is

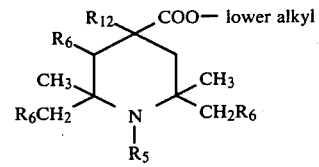

Such an acid can be attached to an olefin/vinyl alcohol or an olefin/vinyl acetate copolymer by standard esterification or transesterification techniques.

The alcohols, amines and acids containing the hindered amine groups are well known in the art.

The piperidinyl derivatives used as reactants are also known compounds. The preparation of the compounds of the formula XI

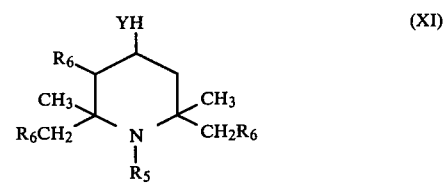

where Y is —O— or —NR— has been described, for example, in U.S. Pat. No. 4,014,887 (4-hydroxypiperidines) or in U.S. Pat. No. 3,684,765 (4-aminopiperidines).

The compounds of the formulae XII and XIV

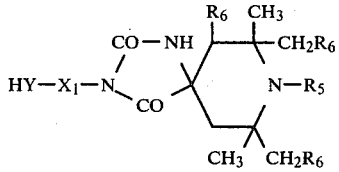

(XII)

and

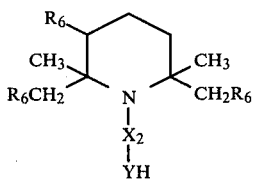

(XIV)

can be prepared analogously to the methods described in U.S. Pat. No. 3,941,744.

The preparation of compounds of the formula XIII

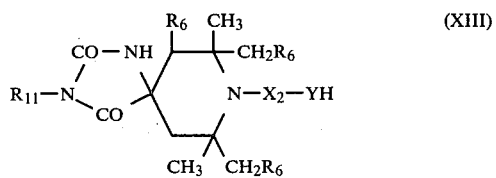

(XIII)

is known, for example, from U.S. Pat. No. 3,975,357.

The compounds of the formula XI, XII, XIII and XIV which have different substituents in the 2-position and the 6-position of the piperidyl ring can be prepared by reacting a ketone of the formula $CH_3-CO-CH_2-R_6$ with ammonia. The pyrimidine formed is hydrolysed to an aminoketone of the formula XV, as described in Helv. Chim. Acta 30, 114 (1947).

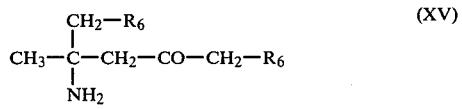

(XV)

In a second process step, the compounds of the formula XV are reacted with ammonia and a ketone $CH_3-CO-CH_2-R_6$, as has been described for example, in Monatsh. Chemie, 88,464 (1957) (in the indicated formulae, $R_6$ is as defined above). The compounds of the formulae XI and XII in which $R_5$ is hydrogen can be obtained by hydrolysis from the pyrimidine obtained in this way.

The compounds which carry substituents other than hydrogen in the 1-position and/or the 4-position are prepared analogously to the methods described in the literature references cited above.

While copolymers of this invention are very effective stabilizers for a host of organic substrates subject to light induced deterioration, as are the hindered amines in general, the instant compounds with their surprising resistance to loss from a stabilized composition during high temperature processing due to volatilization, exudation or sublimation have particular value in stabilizing polymeric substrates which are perforce processed at elevated temperatures.

The copolymers of this invention are particularly useful as stabilizers for the protection of polyolefins, particularly polyethylene, polypropylene and polypropylene fibers.

The reasons for this are not certain, but may be related to the high compatibility of the instant olefin, particularly ethylene, copolymers in the polyolefin substrates coupled with an enhanced or more efficient utilization of the polar hindered amine stabilizing warheads.

Indeed, it is contemplated that the structure of the instant ethylene copolymers provides an optimum balance between ethylene units for compatibility and separated polar units with pendant hindered amine groups for stabilization efficacy. It appears that the instant copolymers containing a majority of ethylene units along the copolymer backbone with a lesser number of structural units containing pendant hindered amine groups interspersed thereamong allows for a more effective use of the hindered amine moieties, prevents their undesired agglomeration in the polyolefin substrate and leads to stabilization protection far beyond what would be expected from the same total concentration of stabilizer having no ethylene components. Indeed, the instant copolymers even with less than 10 mol percent of units having pendant hindered amine groups are very effective light stabilizers in polyolefin substrates.

The copolymers of this invention are effective light stabilizers in a wide range of organic polymers. Polymers which can be stabilized include:

1. Polymers which are derived from mono- or diolefins, e.g., polyethylene which can optionally be crosslinked, polypropylene, polyisobutylene, polymethylbutene-1, polymethylpentene-1, polyisoprene, polybutadiene.

2. Mixtures of the homopolymers cited under (1), for example mixtures of polypropylene and polyethylene, polypropylene and polybutene-1, polypropylene and polyisobutylene.

3. Copolymers of the monomers based on the hompolymers cited under (1), for example ethylene/propylene copolymers, propylene/butene-1, copolymers, propylene/isobutylene copolymers, ethylene/butene-1 copolymers as well as terpolymers of ethylene and propylene with a diene, for example hexadiene, dicyclopentadiene or ethylidene norbornene, and copolymers of $\alpha$-olefins, e.g., ethylene with acrylic or methacrylic acid.

4. Polystyrene.

5. Copolymers of styrene and of $\alpha$-methylstyrene, for example styrene/butadiene copolymers, styrene/acrylonitrile copolymers, styrene/acrylonitrile/methacrylate copolymers, styrene/acrylonitrile copolymers modified with acrylic ester polymers to provide impact strength as well as block copolymers, e.g., styrene/butadiene/styrene block copolymers.

6. Graft copolymers of styrene, for example the graft polymer of styrene to polybutadiene, the graft polymer of styrene with acrylonitrile to polybutadiene as well as mixtures thereof with the copolymers cited under (5), commonly referred to as acrylonitrile/butadiene/styrene or ABS plastics.

7. Halogen-containing vinyl polymers, for example polyvinyl chloride, polyvinylidene chloride, polyvinyl fluoride, polychloroprene, chlorinated rubbers, vinyl chloride/vinylidene chloride copolymers, vinyl chloride/vinyl acetate copolymers, vinylidene chloride/vinyl acetate copolymers.

8. Polymers which are derived from $\alpha,\beta$-unsaturated acids and derivatives thereof, such as polyacrylates and polymethacrylates, polyacrylic amides and polyacrylonitrile.

9. Polymers which are derived from unsaturated alcohols and amines and from the acyl derivatives thereof or acetals, for example polyvinyl alcohol, polyvinyl acetate, polyvinyl stearate, polyvinyl benzoate, polyvinyl maleate, polyvinyl butyral, polyallyl phthalate, polyallyl melamine and copolymers thereof with other vinyl compounds, for example ethylene/vinyl acetate copolymers.

10. Homopolymers and copolymers which are derived from epoxides, for example polyethylene oxide or the polymers which are derived from bis-glycidyl ethers.

11. Polyacetals, for example polyoxymethylene, as well as polyoxymethylenes which contain ethylene oxide as comonomer.

12. Polyalkylene oxides, for example polyoxyethylene, polypropylene oxide or polybutylene oxide.

13. Polyphenylene oxides.

14. Polyurethanes and polyureas, such as in urethane coatings.

15. Polycarbonates.

16. Polysulfones.

17. Polyamides and copolyamides which are derived from diamines and dicarboxylic acids and/or from aminocarboxylic acids or the corresponding lactams, for example polyamide 6, polyamide 6/6, polyamide 6/10, polyamide 11, polyamide 12, poly-m-phenylene-isophthalamide.

18. Polyesters which are derived from dicarboxylic acids and dialcohols and/or from hydroxycarboxylic acids or the corresponding lactones, for example polyethylene glycol terephthalate, poly-1,4-dimethylolcyclohexane terephthalate.

19. Cross-linked polymers which are derived from aldehydes on the one hand and from phenols, ureas and melamine on the other, for example phenol/formaldehyde, urea/formaldehyde and melamine/formaldehyde resins.

20. Alkyd resins, for example glycerol/phthalic acid resins and mixtures thereof with melamine/formaldehyde resins.

21. Unsaturated polyesters resins which are derived from copolyesters of saturated and unsaturated dicarboxylic acids with polyhydric alcohols as well as from vinyl compounds as cross-linking agents and also the halogen-containing, flame-resistant modifications thereof.

22. Natural polymers, for example cellulose, rubber, as well as the chemically modified homologous derivatives thereof, for example cellulose acetates, cellulose propionates and cellulose butyrates and the cellulose ethers, for example methyl cellulose.

The stabilizing of polyolefins, styrene polymers and polyamides and of polyurethanes is of particular importance, and the instant copolymers are outstandingly suitable for this. Examples of such polymers are high density and low density polyethylene, polypropylene, ethylene/propylene copolymers, polystyrene, styrene/butadiene/acrylonitrile terpolymers, mixtures of polyolefins or of styrene polymers, and polyurethanes based on polyethers or polyesters, in the form of lacquers, filaments, films, sheets, elastomers or foams.

The copolymeric stabilizers are added to the plastics in a concentration of 0.05 to 5% by weight, calculated relative to the material to be stabilized. Preferably, 0.1 to 2.5% by weight of the copolymers calculated relative to the material to be stabilized, are incorporated into the latter.

Incorporation can be effected after polymerization, for example by mixing the compounds and, if desired, further additives into the melt by the methods customary in the art, before or during shaping, or by applying the dissolved or dispersed compounds to the polymer, with subsequent evaporation of the solvent if necessary.

The novel copolymers can also be added to the plastics to be stabilized in the form of a master batch which contains these copolymers, for example in a concentration of 2.5 to 25% by weight.

Although the compounds of the invention may be used to provide a light stabilizing function, the compounds of this invention are often combined with other stabilizers, even other light stabilizers, in the preparation of stabilized compositions. The stabilizers may be used with phenolic antioxidants, pigments, colorants or dyes, light stabilizers such as hindered amines, metal deactivators, etc.

In general, the stabilizers of this invention are employed from about 0.05 to about 5% by weight of the stabilized composition, although this will vary with the particular substrate and application. An advantageous range is from about 0.1 to about 2.5%.

The stabilizers of Formula I may readily be incorporated into the organic polymers of conventional techniques, at any convenient stage prior to the manufacture of shaped articles therefrom. For example, the stabilizer may be mixed with the polymer in dry powder form, or a suspension or emulsion of the stabilizer may be mixed with a solution, suspension, or emulsion of the polymer. The stabilized polymer compositions of the invention may optionally also contain from about 0.05 to about 5%, preferably from about 0.1 to about 2.5% by weight of various conventional additives, such as the following, particularly phenolic antioxidants or light-stabilizers, or mixtures thereof:

1. Antioxidants 1.1 Simple 2,6-dialkylphenols, such as, for example, 2,6-di-tert.-butyl-4-methylphenol, 2-tert.-butyl-4,6-dimethylphenol, 2,6-di-tert.-butyl-4-methoxymethylphenol and 2,6-dioctadecyl-4-methylphenol.

1.2 Derivatives of alkylated hydroquinones, such as for example, 2,5-di-tert.-butyl-hydroquinone, 2,5-di-tert.-amyl-hydroquinone, 2,6-di-tert.-butyl-hydroquinone, 2,5-di-tert.-butyl-4-hydroxy-anisole, 3,5-di-tert.-butyl-4-hydroxy-anisole, 3,5-di-tert.-butyl-4-hydroxyphenyl stearate and bis-(3,5-di-tert.-butyl-4-hydroxyphenyl) adipate.

1.3 Hydroxylated thiodiphenyl ethers, such as for example, 2,2'-thio-bis-(6-tert.-butyl-4-methylphenol), 2,2'-thio-bis-(4-octylphenol), 4,4'-thio-bis-(tert.-butyl-3-methylphenol), 4,4'-thio-bis-(3,6-di-sec.-amylphenol), 4,4'-thio-bis-(6-tert.-butyl-2-methylphenol) and 4,4'-bis-(2,6-dimethyl-4-hydroxyphenyl) disulfide.

1.4 Alkylidene-bisphenols, such as, for example, 2,2'-methylene-bis-(6-tert.-butyl-4-methylphenol), 2,2'-methylene-bis-(6-tert.-butyl-4ethylphenol), 4,4'-methylene-bis-(6-tert.-butyl-2-methylphenol), 4,4'-methylene-bis-(2,6-di-tert.-butyl-phenol), 2,6-di-(3-tert.-butyl-5-methyl-2-hydroxybenzyl)-4-methylphenol, 2,2'-methylene-bis-[4-methyl-6-(-methylcyclohexyl)-phenol], 1,1-bis(3,5-dimethyl-2-hydroxyphenyl)-butane, 1,1-bis-(5-tert.-butyl-4-hydroxy-2-methylphenyl)-butane, 2,2-bis-(3,5-di-tert.-butyl-4-hydroxyphenyl)-propane, 1,1,3-tris-(5-tert.-butyl-4-hydroxy-2-methylphenyl)-butane, 2,2-bis-(5-tert.-butyl-4-hydroxy-2-methylphenyl)-4n- dodecylmercapto-butane, 1,1,5,5-tetra-(5-tert.-butyl-4-hydroxy-2-methylphenyl)-pentane and ethylene glycol bis-[3,3-bis-(3-tert.-butyl-4-hydroxyphenyl)-butyrate].

1.5 O-, N- and S-benzyl compounds, such as for example, 3,5,3',5'-tetra-tert.-butyl-4,4'-dihydroxydibenzyl ether, octadecyl 4-hydroxy-3,5-dimethylbenzyl-mercaptoacetate, tris-(3,5-di-tert.-butyl-4-hydroxybenzyl)-amine and bis-(4-tert.-butyl-3-hydroxy-2,6-dimethyl-benzyl) dithioterephthtalate.

1.6 Hydroxybenzylated malonates, such as for example, dioctadecyl 2,2-bis-(3,5-di-tert.-butyl-2-hydroxybenzyl)-malonate, dioctadecyl 2-(3-tert.-butyl-4-hydroxy-5-methylbenzyl)-malonate, di-dodecylmercapto-ethyl 2,2-bis-(3,5-di-tert.-butyl-4-hydroxybenzyl)-malonate and di-[4-(1,1,3,3-tetramethylbutyl)-phenyl] 2,2-bis-(3,5-di-tert.-butyl-4-hydroxybenzyl)-malonate.

1.7 Hydroxybenzyl-aromatic compounds, such as, for example, 1,3,5-tri-(3,5-di-tert.-butyl-4-hydroxybenzyl)-2,4,6-trimethyl-benzene, 1,4-di-(3,5-di-tert-butyl-4-hydroxybenzyl)-2,3,5,6-tetramethylbenzene and 2,4,6-tri-(3,5-di-tert.-butyl-4-hydroxy-benzyl)-phenol.

1.8 s-Triazine compounds, such as, for example 2,4-bis-octylmercapto-6-(3,5-di-tert.-butyl-4-hydroxy-anilino)-s-triazine, 2-octylmercapto-4,6-bis-(3,5-di-tert.-butyl-4-hydroxy anilino)-s-triazine, 2-octylmercapto-4,6-bis-(3,5-di-tert.-butyl-4-hydroxyphenoxy)-s-triazine, 2,4,6-tris-(3,5-di-tert.-butyl-4-hydroxyphenoxy)-s-triazine, 2,4,6-tris-(3,5-di-tert.-butyl-4-hydroxyphenylethyl)-s-triazine and 1,3,5-tris-(3,5-di-tert.-butyl-4-hydroxybenzyl) isocyanurate.

1.9 Amides of β-(3,5-di-tert.-butyl-4-hydroxyphenyl)-propionic acids, such as, for example 1,3,5-tris-(3,5-di-tert.-butyl-4-hydroxyphenyl-propionyl)-hexahydro-s-triazine and N,N'-di-(3,5-di-tert.-butyl-4-hydroxyphenyl-propionyl)-hexamethylenediamine, N,N'-bis-β-(3,5-di-t-butyl-4-hydroxyphenyl)-propionyl-hydrazine.

1.10 Esters of β-(3,5-di-tert.-butyl-4-hydroxyphenyl)-propionic acid with monohydric or polyhydric alcohols, such as for example, with methanol, ethanol, octadecanol, 1,6-hexanediol; 1,9-nonanediol, ethylene glycol, 1,2-propane-diol, diethylene glycol, thiodiethylene glycol, neopentylglycol, pentaerythritol, 3-thiaundecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2.2.2]octane.

1.11 Esters of β-(5-tert.-butyl-4-hydroxy-3-methylphenyl)-propionic acid with monohydric or polyhydric alcohols, such as for example, with methanol, ethanol, octadecanol, 1,6-hexanediol, 1-9-nonanediol, ethylene glycol, 1,2-propanediol, di-ethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo[2.2.2.]octane.

1.12 Esters of 3,5-di-tert.-butyl-4-hydroxyphenylacetic acid with monohydric or polyhydric alcohols, such as for example, with methanol, ethanol, octadecanol, 1,6-hexanediol, 1,9-nonanediol, ethylene glycol, 1,2-propanediol, diethylene glycol, thiodiethylene glycol, neopentylglycol, pentaerythritol, 3-thia-undecanol, 3-thia-pentadecanol, trimethylhexanediol, trimethylolethane, trimethylolpropane, tris-hydroxyethyl isocyanurate and 4-hydroxymethyl-1-phospha-2,6,7-trioxabicyclo-[2.2.2]-octane, especially the tetrakis ester of pentaerythritol.

1.13 Benzylphosphonates, such as, for example, dimethyl 3,5 di-tert.-butyl-4-hydroxybenzylphosphonate, diethyl 3,5-di-tert.-butyl-4-hydroxybenzylphosphonate, dioctadecyl 3,5-di-tert.-butyl-4-hydroxybenzylphosphonate and dioctadecyl 5-tert.-butyl-4-hydroxy-3-methylbenzylphosphonate.

2. Light-stabilizers 2.1 Esters of optionally substituted benzoic acids, e.g., 3,5-di-tert.-butyl-4-hydroxybenzoic acid, 2,4-di-tert.-butyl-phenyl ester or -octadecyl ester or 2-methyl-4,6-di-tert.-butyl-phenyl ester.

2.2 Sterically hindered amines e.g., 4-benzoyl-2,2,6,6-tetramethylpiperidine, 4-stearyloxy-2,2,6,6-tetramethylpiperidine, bis-(2,2,6,6-tetramethylpiperidyl) sebacate, bis-(1,2,2,6,6-pentamethylpiperidyl) sebacate, bis-(1,2,2,6,6-pentamethylpiperidyl) 2-n-butyl-2-(2-hydroxy-3,5-di-tert-butyl-benzyl)malonate or 3-n-octyl-7,7,9,9-tetra-methyl-1,3,8-triazaspiro[4.5]decane-2,4-dione.

2.3 Oxalic acid diamides, e.g., 4,4'-di-octyloxy-oxanilide, 2,2'-di-octyloxy-5,5'-di-tert.butyl-oxanilide, 2,2'-didodecycloxy-5,5'-di-tert.-butyl-oxanilide, 2-ethoxy-2'-ethyl-oxanilide, N,N'-bis-(3-dimethyl-aminopropyl)-oxalamide, 2-ethoxy-5-tert.-butyl-2'-ethyl-oxanilide and the mixture thereof with 2-ethoxy-2'-ethyl-5,4'-di-tert.-butyl-oxanilide, or mixture of ortho- and para-methoxy-as well as of o- and p-ethoxy-di-substituted oxanilides.

3. Metal deactivators, e.g., oxanilidine, isophthalic acid dihydrazide, sebacic acid-bis-phenylhydrazide, bis-benzylidene-oxalic acid dihydrazide, N,N'-diacetaladipic acid dihydrazide, N,N'-bis-salicycloyl-oxalic acid dihydrazide, N,N'-bis-salicyloylhydrazine, N,N'-bis-(3,5-di-tert.-butyl-4-hydroxyphenylpropionyl)-hydrazine, N-salicyloyl-N'-salicylalhydrazine, 3-salicyloyl-amino-1,2,4-triazole or N,N'-bis-salicyloyl-thiopropionic acid dihydrazide.

4. Basic co-stabilizers, e.g., alkali metal salts and alkaline-earth salts of higher fatty acids, for example Ca-stearate, Zn-stearate, Mg-behenate, Na-ricinoleate or K-palmitate.

5. Nucleation agents, e.g., 4-tert.-butylbenzoic acid, adipic acid or diphenylacetic acid.

6. Phosphites and phosphonites, such as, for example, triphenyl phosphite, diphenylalkyl phosphites, phenyldialkyl phosphites, tri-(nonyl-phenyl) phosphite, trilauryl phosphite, trioctadecyl phosphite and 3,9-isodecyloxy-2,4,8,10-tetraoxa-3,9-diphospha-[5.5]-undecane and tetra(2,4-di-tert-butylphenyl) diphenylene-4,4'-bis(phosphonite).

Other additives that can be incorporated in the stabilized compositions are thiosynergists such as dilauryl thiodipropionate, lubricants such as stearyl alcohol, fillers, asbestos, kaolin, talc, glass fibers, pigments, optical brighteners, flameproofing agents and antistatic agents.

While the instant copolymers containing pendant hindered amine moieties G are particularly useful as stabilizers for polymeric substrates, it is also contemplated that said copolymers would provide dyesites for the subsequent dyeing of the stabilized polymer with acid dyes. This would be most beneficial in the dyeing of polyolefins such as polypropylene by the inclusion of the hindered amine basic site into polyolefin fiber.

The following examples are presented for the purpose of illustration only and are not to be construed to limit the nature or scope of the instant invention in any manner whatsoever.

EXAMPLE 1

Ethylene/2,2,6,6-Tetramethylpiperidin-4-yl Acrylate Copolymer

In a 500-ml 3-necked round-bottomed flask fitted with a stirrer, reflux condenser, thermometer, nitrogen inlet tube and an oil bath was placed a mixture of 14.5 grams of ethylene/ethyl acrylate copolymer (77/23) with a number average molecular weight of 28,000 with an ethyl acrylate content of 23% by weight (=0.033 mole of ethyl acrylate), 15.7 grams (0.1 mole) 2,2,6,6-tetramethylpiperidin-4-ol and 0.3 gram of tetrabutyl titanate. The mixture was heated at 175° C. under a nitrogen atmosphere for 20 hours with gentle stirring.

A quantitative amount (0.033 mole, 1.52 grams) of ethanol was liberated in the transesterification reaction and was collected in a suitable trap cooled by an acetone-dry ice bath.

The resulting copolymer product was then dissolved in 150 ml of anhydrous toluene. The toluene solution was then added dropwise into an excess of anhydrous hexane to precipitate the copolymer. The copolymer was isolated by filtration and then suspended in refluxing acetone to extract any unreacted 2,2,6,6-tetramethylpiperidin-4-ol. The extracted and purified desired copolymer was isolated by filtration and dried at 50° C./0.2 mm for 7 hours. The desired copolymer was obtained in a yield of 15.5 grams (95%).

Analysis: Calculated (%) C: 79.02; H: 12.55; N: 2.57. Found (%) C: 79.94; H: 12.01; N: 2.08.

EXAMPLE 1a

When the reaction of Example 1 was carried out using only 3.15 grams (0.02 mole) of 2,2,6,6-tetramethylpiperidin-4-ol, that is an 0.6 molar equivalent of 2,2,6,6-tetramethylpiperidin-4-ol rather than a 3 molar equivalent amount per pendant ester group in the ethylene/ethyl acrylate (77/23) copolymer, a product was obtained in which approximately half the pendant ethyl ester groups were replaced by hindered amine moieties. The product contained 1.12% nitrogen.

EXAMPLE 2

Ethylene/2,2,6,6-Tetramethylpiperidin-4-yl Acrylate Copolymer

The above-named copolymer was prepared using the general procedure of Example 1 by the use of an equivalent amount of an ethylene/ethyl acrylate (82/18) copolymer with a number average molecular weight of 33,000 with an ethyl acrylate content of 18% by weight.

Analysis: Calculated (%) C: 80.10; H: 13.02; N: 2.10. Found (%) C: 80.38; H: 12.85; N: 1.78.

EXAMPLE 3

Ethylene/2,2,6,6-Tetramethylpiperidin-4-yl Acrylate Copolymer

The above-named copolymer was prepared using the general procedure of Example 1 by the use of an equivalent amount of an ethylene/ethyl acrylate (61/39) copolymer with a number average molecular weight of 28,000 with an ethyl acrylate content of 39% by weight.

Analysis: Calculated (%) C: 75.56; H: 11.86; N: 3.83. Found (%) C: 74.84; H: 11.38; N: 3.22.

EXAMPLE 4

Ethylene/1,2,2,6,6-Pentamethylpiperidin-4-yl Acrylate Copolymer

The above-named copolymer was prepared by the general procedure of Example 1 by substituting for the 2,2,6,6-tetramethylpiperidin-4-ol an equivalent amount of 1,2,2,6,6-penta-methylpiperidin-4-ol, and reacting with an ethylene/ethyl acrylate copolymer (77/23).

Analysis: Calculated (%) C: 79.06; H: 12.56; N: 2.55. Found (%) C: 79.07; H: 12.36; N: 2.32.

EXAMPLE 5

Ethylene/1-(2-Acryloyloxyethyl)-3,3,5,5-tetramethylpiperazine-2,6-dione Copolymer The above-named copolymer was prepared by the general procedure of Example 1 by substituting for the 2,2,6,6-tetramethylpiperidin-4-ol an equivalent amount of 1-(2-hydroxyethyl)-3,3,5,5-tetramethylpiperazine-2,6-dione. The reaction was run at 210° C.

Analysis: Calculated (%) C: 75.46; H: 11.86; N: 3.86. Found (%) C: 75.43; H: 11.48; N: 3.50.

EXAMPLE 6

Ethylene/1,2,2,6,6-Pentamethylpiperidin-4-yl Acrylate Copolymer

To a 1000 ml round bottomed flask fitted as was the flask in Example 1 was charged 46.2 grams of 1,2,2,6,6-pentamethylpiperidin-4-ol and 50 grams of ethylene/ethyl acrylate (82/18) copolymer having a number average molecular weight of 33,000, an ethyl acrylate content of 18% by weight, and a melt flow rate of 6 g/10 min. (ASTM D1238, cond. E).

The mixture was heated under a nitrogen atmosphere at 180° C. for 30 minutes till essentially all the polymer pellets were melted. The hot melt was gently stirred to give a hot homogeneous mix to which 1 gram of tetrabutyl titanate was added.

The reaction temperature was raised to 210° C. and aliquot samples of product were taken at 4-hour intervals. After 12 hours, the temperature was lowered to 120° C. and 500 ml of toluene were added slowly with stirring. The resulting toluene solution was then added slowly into 2000 ml of methanol with vigorous stirring to precipitate the desired product. The precipitate was suspended in the methanol with stirring for another five hours before isolating by filtration. The isolated product was washed with methanol and dried at room temperature/0.1 mm for 1 hour and then at 80° C./0.1 mm for two hours. The copolymer was obtained as free flowing white granules readily soluble in hot toluene or hot xylene.

Analysis: Calculated (%) C: 80.22; H: 13.05; N: 2.05. Found (%) C: 80.23; H: 13.07; N: 1.96.

EXAMPLE 7

Ethylene/2,2,6,6-Tetramethylpiperidin-4-yl Acrylate Copolymer

The above-named copolymer was prepared by the general procedure of Example 6 by substituting for 1,2,2,6,6-pentamethylpiperidin-4-ol an equivalent amount of 2,2,6,6-tetra-methylpiperidin-4-ol. The product had a melt flow rate of 8 g/10 min. (ASTM D1238, cond. E).

Analysis: Calculated (%) C: 80.10; H: 13.02; N: 2.15. Found (%) C: 80.85; H: 12.53; N: 1.98.

The copolymer was obtained as free flowing white granules which were soluble in hot xylene or hot toluene.

EXAMPLE 8

Ethylene/2,2,6,6-Tetramethylpiperidin-4-yl- Acrylate Copolymer

Using the procedure of Example 7, but with an ethylene/ethyl acrylate copolymer having a number average molecular weight of 33,600 and an ethyl acrylate content of 18% by weight, the above-named copolymer was obtained as white rubbery granules. The copolymer was readily soluble in hot xylene or hot toluene.

EXAMPLE 9

Ethylene/2,2,6,6-Tetramethylpiperidin-4-yl Acrylate Copolymer

To a 500-ml resin kettle equipped with a stirrer and thermometer was charged 86.1 grams of a granulated copolymer of ethylene/methyl acrylate (80/20) having a melt index of 2 (ASTM method D 1238, cond. E). The copolymer contained 17.2 grams (0.2 moles) of methyl acrylate. To the polymer was added 80 ml of xylene and 39.3 grams (0.25 moles) of 2,2,6,6-tetramethylpiperidin-4-ol. The reaction mixture was heated for 30 minutes at 150° C. and then 0.23 gram (0.01 mole) of lithium amide catalyst was added. The mixture was heated for a further 8 hours at 145°–150° C. with stirring while a slow nitrogen sweep stream was passed through the system. The catalyst was then deactivated by the addition of one ml of acetic acid followed by stirring for two hours at 145° C.

The viscous liquid mass was poured onto aluminum sheets and cooled. The now solidified product was cut into small pieces and ground in a Wiley mill together with dry ice. The ground product (160 grams) was washed with a total of 1000 ml of methanol in six portions and then dried at room temperature. The product contained 2.02% nitrogen (calculated, for complete replacement of methyl ester by hindered amine, 2.52% nitrogen).

NMR spectra indicated 20% residual methyl ester groups in the product. Transesterification was thus 80% complete. Evaporation of the methanol washings resulted in a quantitative recovery of the remaining unreacted 2,2,6,6-tetramethylpiperidin-4-ol (13.7 grams, 0.087 moles).

EXAMPLE 10

Copolymer with Pendant Amide Groups

A mixture of 15 grams of an ethylene/ethyl acrylate (82/18) copolymer, 36 grams of 4-(γ-aminopropylamino)-2,2,6,6-tetramethylpiperidine and 13 grams of ground potassium fluoride was heated at 200° C. for 25 hours. The reaction mixture was then diluted with 50 ml of xylene and poured into 1000 ml of methanol. The resulting precipitate was filtered, washed thoroughly with ethanol and water, and then dried. The nitrogen content of 2.29% indicated that approximately 40% of the pendant ethyl ester groups had been converted into the hindered amine amide groups.

EXAMPLES 11–16

The following polymers were obtained by transesterification of an ethylene/ethyl acrylate (82/18) copolymer using the alcohols indicated in the table below. The transesterification reactions were carried out in the presence of tetrabutyl titanate as catalyst at 150°–200° C.

| Example No. | Alcohol | Polymer $M_n$ | % N calcd | % N found |
|---|---|---|---|---|
| 11 | HO—(CH$_2$)$_6$—NH—[2,2,6,6-tetramethylpiperidine-NH] | 45500 | 3.65 | 3.29 |
| 12 | HOCH$_2$CH$_2$—N=[2,2,6,6-tetramethylpiperidine with O,O substituents]—NH | 43000 | 3.86 | 3.32 |
| 13 | HOCH$_2$CH$_2$—N(CH$_3$)—[2,2,6,6-tetramethylpiperidine-NH] | 44000 | 3.79 | 3.19 |

| Example No. | Alcohol | Polymer $M_n$ | Polymer % N calcd | % N found |
|---|---|---|---|---|
| 14 | HOCH$_2$CH$_2$OCH$_2$CH$_2$—NH—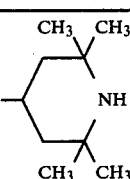 | 45000 | 3.71 | 2.95 |
| 15 | HOCH$_2$CH$_2$OCH$_2$CH$_2$—N(CH$_3$)—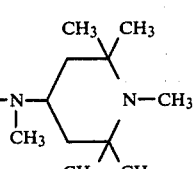—N—CH$_3$ | 46500 | 3.58 | 3.08 |
| 16 | HOCH$_2$CH$_2$—N(C$_4$H$_9$)—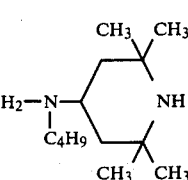—NH | 45,500 | 3.65 | 3.05 |

EXAMPLE 17

Accelerated UV Light Exposure Testing

Polypropylene powder (Hercules Profax 6401) was thoroughly blended with 0.2% by weight of the antioxidant, di(n-octadecyl) 3,5-di-tert-butyl-4-hydroxybenzylphosphonate, which prevents oxidative degradation of polypropylene during processing and with 0.5% of a light stabilizer being tested. The blended materials were then milled on a two-roll mill at 182° C. for 5 minutes after which time the stabilized polypropylene was sheeted from the mill and allowed to cool.

The milled polypropylene sheets were cut into pieces and processed for 3 minutes on a hydraulic press at 220° C. and 175 psi (12.3 Kg/cm$^2$) pressure. The resulting sheet of 5 mil (0.127 mm) thickness was water cooled in the press.

The 5 mil (0.127 mm) film was tested in a fluorescent sunlight black light environment with the development of carbonyl absorption in the infrared spectrum at the 5.85 micron wavelength being the measure of stabilization protection afforded by the stabilizers present in the polypropylene. Failure was taken as the hours required to cause the carbonyl absorption to reach a value of 0.5. Such a value correlates with the reduction of physical properties of the polypropylene pellicle to unacceptable levels and is proportional to the amount of degradation caused by the ultraviolet light exposure. The results are set out in Table A.

TABLE A

| Polypropylene plus 0.2% by weight antioxidant* plus 0.5% by weight light stabilizer of Example No. | Fluorescent Sunlight Black Light Test Hours to Failure (0.5 Carbonyl Absorption) |
|---|---|
| No light stabilizer | 560 |
| 1 | 1170 |
| 2 | 1790 |
| 3 | 2200 |
| 4 | 1640 |
| 5 | 970 |

TABLE A-continued

| Polypropylene plus 0.2% by weight antioxidant* plus 0.5% by weight light stabilizer of Example No. | Fluorescent Sunlight Black Light Test Hours to Failure (0.5 Carbonyl Absorption) |
|---|---|
| 6 | 1270 |
| 7 | 1250 |
| Homopolymer of 1-(2-acryloyloxyethyl)-3,3,5,5-tetramethylpiperazine-2,6-dione | 520 |

*antioxidant is di(n-octadecyl) 3,5-di-tert-butyl-4-hydroxybenzylphosphonate.

The instant ethylene copolymers provide uniformly enhanced UV light stabilization protection to propylene whereas an acrylate homopolymer having a pendant hindered amine group was essentially ineffectual in affording any protection against UV-light induced deterioration.

EXAMPLE 18

Thermal Stability of Light Stabilizers

Several instant ethylene copolymers as well as selected homopolymers made from ethylenically unsaturated monomers containing pendant hindered amine moieties were subjected to thermal gravimetric analysis in air both isothermally at 260° C. to indicate the % weight loss after 10 minutes at said temperature as well as in a scanning mode at a heating rate of 10° (C.) per minute to ascertain the temperature at which an onset of weight loss was first observed and at which 10% weight loss was reached. These data are given in Table B.

TABLE B

| Light Stabilizer of Example No. | % Weight Loss at 260° C. after Minutes | °C. to Reach 10% Weight Loss | °C. for Onset of Weight Loss |
|---|---|---|---|
| 4 | 0.0 | 337 | 215 |
| 5 | 0.6 | 383 | 210 |
| Homopolymer of | 4.6 | 308 | 165 |

TABLE B-continued

| Light Stabilizer of Example No. | % Weight Loss at 260° C. after Minutes | °C. to Reach 10% Weight Loss | °C. for Onset of Weight Loss |
| --- | --- | --- | --- |
| 1,2,2,6,6-pentamethylpiperidin-4-yl acrylate Homopolymer of 1-(2-acryloyloxy-ethyl)-3,3,5,5-tetramethylpiperazine-2,6-dione | 10.8 | 300 | 150 |

The instant ethylene copolymers exhibit significantly higher thermal stability than do the acrylate homopolymers having pendant hindered amine moieties. This greater thermal stability would allow for the incorporation of the instant light stabilizers into a stabilized polymer composition under rigorous conditions, permitting it to remain there during processing at elevated temperatures and yielding a final polymer pellicle with greater protection against subsequent light-induced deterioration.

EXAMPLE 19

Using the general procedure of Example 17, linear low density polyethylene (Dowlex 2047, initial melt index 3.4 g/10 min) which contained 0.015% by weight of pentaerythrityl tetrakis-(3,5-di-tert-butyl-4-hydroxyhydrocinnamate) as antioxidant was blended with the instant ethylene copolymer light stabilizers and then compression molded into 5 mil (0.127 mm) film test samples.

These samples were tested in a carbon arc Weather-O-meter with water spray attachment to simulate rainfall and in the fluorescent sunlight black light apparatus with the development of carbonyl absorption as measured at the 5.85 micron wavelength in the infrared spectrum taken to indicate the degree of stabilization protection afforded by said light stabilizers. The results are set forth in Table C.

TABLE C

| Linear Polyethylene plus 0.015% by weight antioxidant* plus (% by weight) light stabilizer of Example No. | Hours to Failure (0.5 Carbonyl Absorption) | |
| --- | --- | --- |
| | Carbon Arc WeatherOmeter | Fluorescent Sunlight Black Light |
| No light stabilizer | 379 | 1089 |
| 7 (0.25) | 1881 | >4551 |
| 7 (0.50) | 1961 | >5122 |
| 7 (1.00) | 2036 | >5122 |
| 6 (0.25) | 1831 | >5122 |
| 6 (0.50) | 1833 | >5122 |
| 6 (1.00) | 1814 | >5122 |

*antioxidant is pentaerythrityl tetrakis (3,5-di-tert-butyl-4-hydroxyhydrocinnamate)

These data show the outstanding effectiveness of the instant ethylene copolymers as light stabilizers even at very low concentrations (0.25% by weight) in linear polyethylene.

There was no exudation of the instant ethylene copolymer light stabilizers from linear polyethylene after storage at ambient temperatures for 1000 hours and for 3000 hours.

EXAMPLE 20

Polypropylene (Hercules Profax 6501) containing 0.1% by weight of calcium stearate, but no antioxidant, was blended with the instant ethylene copolymer light stabilizers. The mixture was pelletized and extruded at 450° F. (232° C.) into 4 inch (10.2 cm) tape with a thickness of 5 mil (0.127 mm). The tape was cut into ¼ inch (6.4 mm) wide strips which were then stretched by a 6:1 ratio over Godet rolls at a temperature of 225° F. (107° C.) to give a stretched film tape of 2 mil (0.0508 mm) thickness.

The tape was subjected to long term heat aging at 125° C. by storing in an oven at 125° C. with the hours to failure being taken as the time (hours) required for the elongation value to fall to 50% of the initial value.

Separate samples were also subjected to the carbon arc WeatherOmeter with the same measure of hours to failure being taken.

The results are given in Table D.

TABLE D

| Polyethylene plus 0.1% by weight light stabilizer of Example No. | Hours to Failure (50% Retention of Elongation) | |
| --- | --- | --- |
| | Carbon Arc WeatherOmeter | Long Term Heat Aging (125° C.) |
| no light stabilizer | 344 | 69 |
| 8 | 977 | 471 |
| 7 | 1043 | 443 |
| 6 | 901 | 462 |

These data show that the instant ethylene copolymers are very effective light and heat stabilizers for polypropylene.

EXAMPLE 21

Using the general procedure of Example 20, polypropylene 2 mil (0.0508 mm) tape made with polypropylene (Hercules, Profax 6501) containing 0.1% by weight of calcium stearate, 0.05% by weight of the antioxidant, 2,6-di-tert-butyl-p-cresol, and 0.1% of an ethylene copolymer of this invention was subjected to long term heat aging at 125° C. with hours to failure being recorded when only 50% of the original elongation value of the tape was reached. The results are given in Table E.

TABLE E

| Polypropylene plus 0.05% by weight antioxidant* and 0.1% by weight light stabilizer of Example | Hours to Failure (50% Retention of Elongation Long Term Heat Aging at 125° C. |
| --- | --- |
| no light stabilizer | 43 |
| 8 | 542 |
| 6 | 370 |

*2,6-di-tert-butyl-p-cresol

Again the instant ethylene copolymers exhibit excellent heat stabilization effects for polypropylene.

EXAMPLE 22

Using the general procedure of Example 20, 0.1% of the instant stabilizer was incorporated into polypropylene and exposed in a carbon arc Weather-Ometer. The time required for the elongation value to fall to 50% of the original value was determined. The results are given on Table F.

TABLE F

| Polypropylene plus 0.1% by weight of light Stabilizer of Example No. | Hours to Failure (50% Retention of Elongation) Carbon Arc Weather-Ometer |
| --- | --- |
| no stabilizer | 317 |

TABLE F-continued

| Polypropylene plus 0.1% by weight of light Stabilizer of Example No. | Hours to Failure (50% Retention of Elongation) Carbon Arc Weather-Ometer |
|---|---|
| 11 | 619 |
| 13 | 1185 |
| 14 | 1120 |
| 15 | 1190 |
| 16 | 1166 |

EXAMPLE 23

Ethylene/Vinyl 1,2,2,6,6-Pentamethylpiperidine-4-carboxylate Copolymer

The above-named copolymer is prepared by the general procedure of Example 1 by substituting for the 2,2,6,6-tetramethylpiperidin-4-ol an equivalent amount of methyl 1,2,2,6,6-pentamethylpiperidine-4-carboxylate and reacting with an ethylene/vinyl acetate copolymer (75/25).

EXAMPLE 24

The copolymer of Example 23 is an effective light and heat stabilizer for polypropylene.

What is claimed is:

1. An α-olefin copolymer having recurring structural units, joined in essentially a random fashion, of the formula I

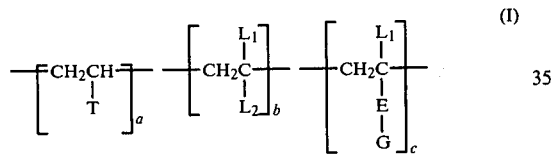

wherein
T is hydrogen, alkyl of 1 to 18 carbon atoms or mixtures thereof,
$L_1$ is hydrogen or methyl,
$L_2$ is hydroxyl, —OCOCH$_3$ or —COOL$_3$,
$L_3$ is hydrogen or alkyl of 1 to 6 carbon atoms,
E is —COO—, —OCO—, —O— or —CONR—,
R is hydrogen, alkyl of 1 to 12 carbon atoms, aralkyl of 7 to 12 carbon atoms, cyclohexyl, hydroxyalkyl of 1 to 6 carbon atoms, alkoxyalkyl of 2 to 10 carbon atoms or dialkylaminoalkyl of 3 to 12 carbon atoms,
G is a group containing an N-heterocyclic ring of the formula

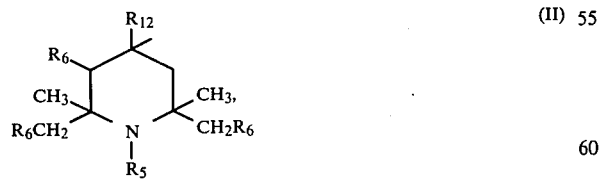

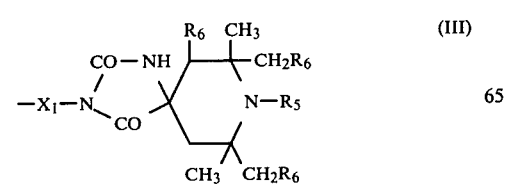

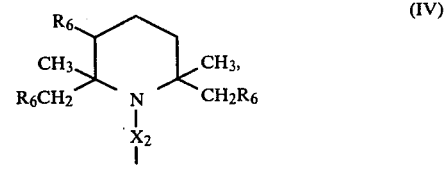

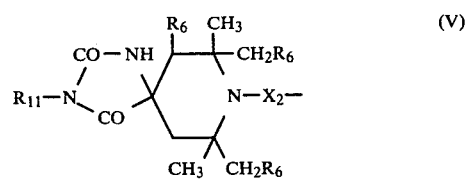

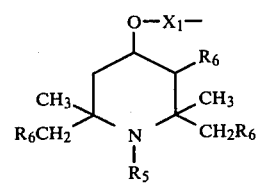

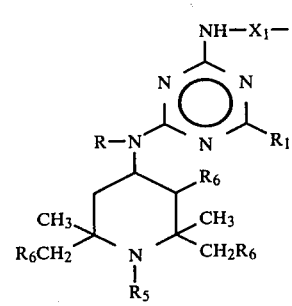

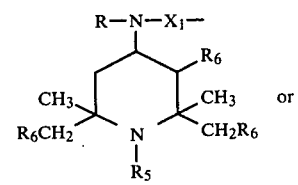

or

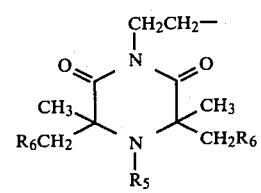

in which $R_5$ is hydrogen, oxyl, $C_1$-$C_{18}$ alkyl, $C_3$-$C_8$ alkenyl, $C_3$-$C_6$ alkynyl, $C_7$-$C_{12}$ aralkyl, —CH$_2$CN, $C_2$-$C_{21}$ alkoxyalkyl, an aliphatic acyl group having 1-4 carbon atoms or one of the groups —CH$_2$COOR$_7$ or —COOR$_8$ in which $R_7$ is $C_1$-$C_{12}$ alkyl, $C_3$-$C_8$ alkenyl, phenyl, $C_7$-$C_8$ aralkyl or cyclohexyl, and $R_8$ is $C_1$-$C_{12}$ alkyl, phenyl, benzyl or cyclohexyl, and $R_6$ is hydrogen or $C_1$-$C_4$ alkyl and $X_1$ is $C_3$-$C_{12}$ alkylene, —CH$_2$CH$_2$OCH$_2$CH$_2$— or a group of the formula —CH(R$_{10}$)—CH$_2$— (VI), in which $R_{10}$ is hydrogen, methyl, ethyl, phenoxymethyl or phenyl, and $X_2$ is a group of the formula VI, in which $R_{10}$ is as defined above, or a group of the formula —CH$_2$—CH(OH)—CH$_2$— (VII), $R_{11}$ is $C_1$-$C_{18}$ alkyl or is cyclohexyl, phenyl or benzyl which are unsubstituted or substituted by $C_1$-$C_4$ alkyl or $C_1$-$C_4$ alkoxy, $R_1$ is alkoxy of 1 to 12 carbon atoms, phenoxy,

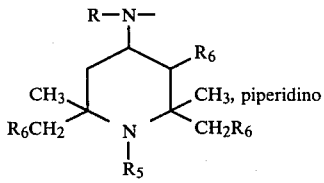

or $NR_2R_3$ where $R_2$ and $R_3$ are hydrogen, alkyl of 1 to 12 carbon atoms, cyclohexyl or benzyl, $R_{12}$ is hydrogen or hydroxyl, with the proviso that, when $R_{12}$ is hydroxyl, E is —OCO—, a+b+c=4 to 2600
a=2 to 2400
b=0 to 198
c=2 to 200
a/a+b+c=0.50 to 0.99
b/a+b+c=0 to 0.49, and
c/a+b+c=0.01 to 0.50.

2. A copolymer according to claim 1 wherein T is hydrogen.

3. A copolymer according to claim 2 wherein b is zero.

4. A copolymer according to claim 2 wherein $L_1$ is hydrogen.

5. A copolymer according to claim 2 wherein $L_2$ is —COOL$_3$, and $L_3$ is alkyl of 1 to 6 carbon atoms.

6. A copolymer according to claim 2 wherein E is —COO— or —CONR—.

7. A copolymer according to claim 2 wherein —E—G is

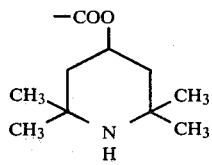

8. A copolymer according to claim 2 which is ethylene/2,2,6,6-tetramethylpiperidin-4-yl acrylate.

9. A copolymer according to claim 2 which is ethylene/1,2,2,6,6-pentamethylpiperidin-4-yl acrylate.

10. A copolymer according to claim 2 which is ethylene/1-(2-acryloyloxyethyl)-3,3,5,5-tetramethylpiperazine-2,6-dione.

11. A composition of matter comprising an organic material subject to light-induced deterioration stabilized with from 0.05 to 5% by weight of a copolymer according to claim 1.

12. A composition according to claim 11 in which the organic material is a polyolefin.

13. A composition according to claim 12 wherein the polyolefin is polyethylene.

14. A composition according to claim 12 wherein the polyolefin is polypropylene.

15. A composition according to claim 11 wherein the copolymer is ethylene/2,2,6,6-tetramethylpiperidin-4-yl acrylate.

16. A method of stabilizing an organic material subject to light-induced deterioration which comprises incorporating in said material from 0.05 to 5% by weight of said material of a copolymer according to claim 1.

17. A method according to claim 16 in which the organic material is a polyolefin.

18. A method according to claim 17 wherein the polyolefin is polyethylene.

19. A method according to claim 17 wherein the polyolefin is polypropylene.

20. A method according to claim 16 wherein the copolymer is ethylene/2,2,6,6-tetramethylpiperidin-4-yl acrylate.

* * * * *